US009998993B2

(12) United States Patent
Moritomo

(10) Patent No.: US 9,998,993 B2
(45) Date of Patent: Jun. 12, 2018

(54) COMMUNICATION APPARATUS, METHOD OF CONTROLLING A COMMUNICATION APPARATUS AND STORAGE MEDIUM

(71) Applicant: CANON KABUSHIKI KAISHA, Tokyo (JP)

(72) Inventor: Kazuo Moritomo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 70 days.

(21) Appl. No.: 15/166,978

(22) Filed: May 27, 2016

(65) Prior Publication Data

US 2016/0360484 A1 Dec. 8, 2016

(30) Foreign Application Priority Data

Jun. 3, 2015 (JP) .................................. 2015-113349

(51) Int. Cl.
*H04W 52/02* (2009.01)

(52) U.S. Cl.
CPC ..... *H04W 52/0219* (2013.01); *H04W 52/028* (2013.01); *H04W 52/0251* (2013.01); *Y02D 70/00* (2018.01); *Y02D 70/142* (2018.01); *Y02D 70/144* (2018.01)

(58) Field of Classification Search
CPC ......... H04W 52/0219; H04W 52/0251; H04W 52/028; Y02B 60/50
See application file for complete search history.

(56) References Cited

U.S. PATENT DOCUMENTS

| 8,705,427 B1* | 4/2014 | Chhabra | ........... H04W 52/0235 370/311 |
| 2008/0181155 A1* | 7/2008 | Sherman | ........... H04W 52/0229 370/311 |
| 2012/0327920 A1* | 12/2012 | Xhafa | ............... H04W 74/0808 370/338 |
| 2016/0066274 A1* | 3/2016 | Pujari | ............... H04W 52/0235 370/311 |

FOREIGN PATENT DOCUMENTS

JP 2007-306201 A 11/2007

* cited by examiner

*Primary Examiner* — Min Jung
(74) *Attorney, Agent, or Firm* — Carter, DeLuca, Farrell & Schmidt, LLP

(57) ABSTRACT

A communication apparatus comprises a first obtaining unit configured to obtain from another communication apparatus information indicating a type of a service that can be executed by using a first communication unit, by using a second communication unit whose power consumption is less than the first communication unit; a second obtaining unit configured to, using the first communication unit, obtain from the another communication apparatus detail information necessary for performing a service indicated by the information obtained by the first obtaining unit; and a control unit configured to perform the service using the first communication unit based on the detail information obtained by the second obtaining unit.

9 Claims, 7 Drawing Sheets

F I G. 8

| SERVICE NAME | COMPATIBLE COMMUNICATION FUNCTIONS |
|---|---|
| FILE TRANSFER | Wi-Fi, BlueTooth |
| PRINT | Wi-Fi, BlueTooth |
| IMAGE TRANSFER | Wi-Fi |
| STREAMING | Wi-Fi |
| OBEX | BlueTooth |
| ... | ... |

COMMUNICATION APPARATUS, METHOD OF CONTROLLING A COMMUNICATION APPARATUS AND STORAGE MEDIUM

BACKGROUND OF THE INVENTION

Field of the Invention

The present invention relates to a communication apparatus, a method of controlling a communication apparatus, and a storage medium.

Description of the Related Art

In recent years, in addition to PCs (Personal Computer), terminal devices in which a Wi-Fi function is equipped such as cellular phones, digital cameras, and printers have spread.

On the other hand, Bluetooth Low Energy (hereinafter BLE), which is capable of communication by lower power consumption compared to Wi-Fi, Bluetooth (registered trademark) version 3.0 and below, and the like, is standardized as one part of a Bluetooth 4.0 specification. In recent years, terminal devices such as smart phones supporting a BLE communication function have spread, and there also exist devices (such as a wristwatch for example) that communicate with smart phones using BLE.

Also, a technique of causing the power consumption of a Wi-Fi communication overall to be reduced by control or notification of an activation/termination of Wi-Fi communication using a communication unit which performs low power consumption communication such as BLE, is known.

In Japanese Patent Laid-Open No. 2007-306201, an ad hoc connection wireless communication system that puts a data communication unit into an inactive state except for during a communication processing interval, in which processing necessary for data communication is performed, using a low-power communication unit capable of wireless communication with another information processing apparatus at a lower power consumption than the data communication unit is disclosed.

However, there is a problem in the technique recited in Japanese Patent Laid-Open No. 2007-306201 in that if a service provision-side communication apparatus provides a service via a Wi-Fi communication function, it is unknown when a usage request for the service will occur, and therefore it is necessary for the communication apparatus to cause the Wi-Fi communication function to be activated continuously, and a great amount power is consumed.

The present invention is something conceived in view of the foregoing problem, and provides a technique for reducing power consumption in accordance with communication processing in a communication apparatus.

SUMMARY OF THE INVENTION

According to one aspect of the present invention, there is provided a communication apparatus, comprising: a first obtaining unit configured to obtain from another communication apparatus information indicating a type of a service that can be executed by using a first communication unit, by using a second communication unit whose power consumption is less than the first communication unit; a second obtaining unit configured to, using the first communication unit, obtain from the another communication apparatus detail information necessary for performing a service indicated by the information obtained by the first obtaining unit; and a control unit configured to perform the service using the first communication unit based on the detail information obtained by the second obtaining unit.

Further features of the present invention will become apparent from the following description of exemplary embodiments with reference to the attached drawings.

BRIEF DESCRIPTION OF THE DRAWINGS

FIG. 8 is a figure illustrating one example of service information that the communication apparatus (the digital camera) according to the first embodiment provides.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Communication System Configuration

Figure 1:
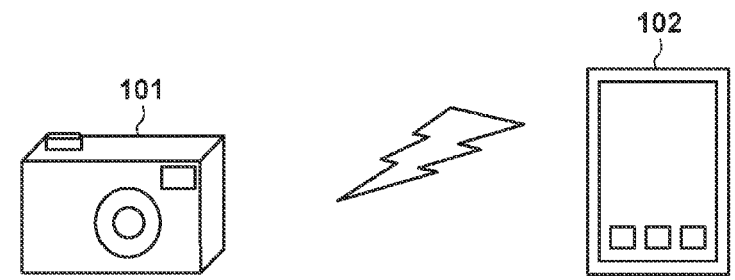
FIG. 1 is a figure illustrating one example of a configuration of a communication system according to an embodiment of the present invention.

Firstly, with reference to FIG. 1, one example of a configuration of a communication system according to an embodiment of the present invention is explained. 101 is a digital camera (DSC: Digital still camera) having a BLE communication function and a wireless LAN communication function (hereinafter, a Wi-Fi communication function) in compliance with an IEEE 802.11 series. 102 is a smart phone having a BLE communication function and a Wi-Fi communication function. The DSC 101 is connectable via a Wi-Fi communication and/or a BLE communication to the smart phone 102. Note that the DSC and the smart phone are examples of communication apparatuses, and application to other communication apparatuses such as a PC or a printer is possible.

The smart phone 102, by utilizing the Wi-Fi communication function, can obtain or browse captured image data which is stored in the DSC 101. The smart phone 102 may also reference to thumbnail information relating to the captured image data which is stored in the DSC 101. The DSC 101 and the smart phone 102 are in a state in which device association processing, (hereinafter, a pairing process) for realizing connection processing in the Wi-Fi communication and the BLE communication, has been completed. In other words, this is a state in which connection processing is performed automatically in accordance with the smart phone 102 detecting device information that the DSC 101 notified via the BLE communication function. Also, this is state in which the Wi-Fi connection can be realized by executing Wi-Fi Direct (registered trademark) between the DSC 101 and the smart phone 102, or by sharing in advance parameters necessary for the Wi-Fi connection.

Here, Wi-Fi Direct (registered trademark), which defines a specification for realizing direct communication between terminals using a terminal which is equipped with a simple base station function, is standardized by the Wi-Fi Alliance which is a world organization for Wi-Fi. In executing Wi-Fi Direct, it is possible to search for a communication apparatus, that handles a service that is executed, prior to a connection. In such a case, the search for a service is executed using a Service Discovery Response frame and a Service Discovery Request frame which use an action frame defined in the IEEE 802.11u. It is possible to discover a communication apparatus corresponding to the service prior to connection, to connect with the discovered communication apparatus by Wi-Fi Direct, and to execute the service communication.

Hereinafter an explanation is given of an example in which, in the communication system, the smart phone 102 obtains image data by the smart phone 102 activating the Wi-Fi communication function provided by the DSC 101 even if the Wi-Fi communication function of the DSC 101 is in an OFF state in this embodiment.

Configuration of the Communication Apparatus
(Digital Camera)

Figure 2:
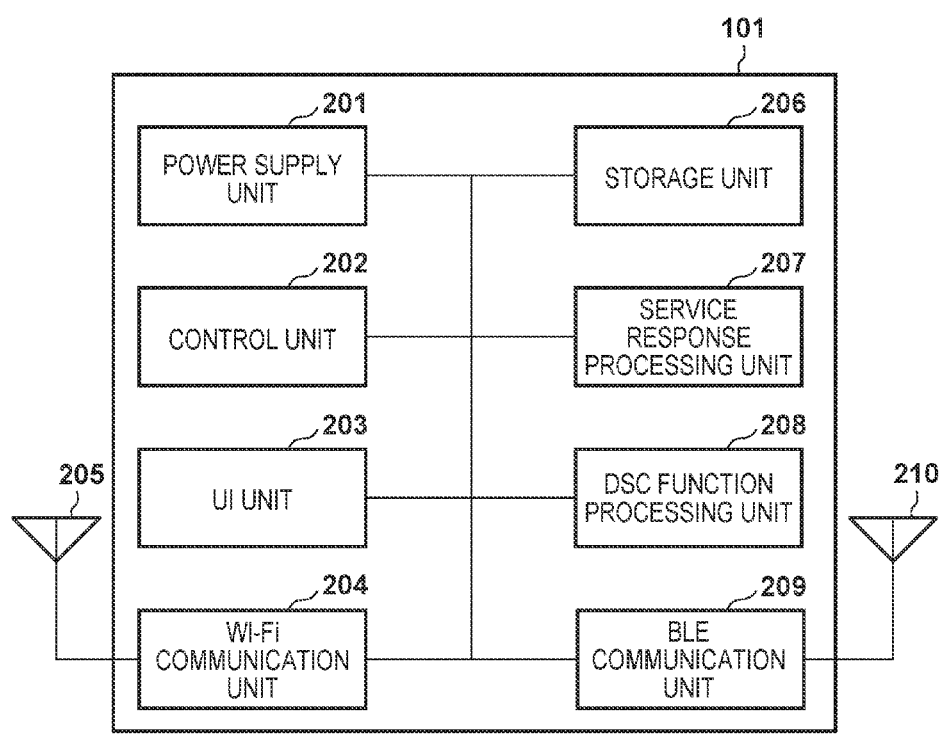
FIG. 2 is a figure illustrating one example of a functional block configuration of a communication apparatus (a digital camera) according to an embodiment of the present invention.

FIG. 2 is a figure illustrating one example of a functional block configuration of the DSC according to an embodiment of the present invention. A power supply unit 201 supplies power to each element of the DSC 101. Additionally, although the power supply unit 201 supplies power obtained from a commercial power supply, it is not limited to this and may be configured to have an integrated battery.

A control unit 202 is configured by a CPU, MPU, or the like, and controls the entire DSC 101 by performing a program which is stored in a storage unit 206. Note, configuration may be taken such that the control unit 202 controls the entire DSC 101 by cooperation with an OS (Operating System) that it is executing.

A user interface unit (hereinafter, the UI unit) 203 executes display of various information, or an acceptance of various operations from a user. A Wi-Fi communication unit 204 executes communication via an antenna 205 which is in compliance with the IEEE 802.11 series. The storage unit 206 is configured by a ROM, RAM, or the like, and stores various information of programs (including the OS), image data, or the like for executing various operations described later. Note, the storage unit 206 may use, in addition to a memory such as a ROM or RAM, a storage medium such as an SD memory.

A service response processing unit 207 generates response content corresponding to a query request which relates to a provisioned service of the DSC 101 received via the Wi-Fi communication unit 204 or a BLE communication unit 209. Otherwise, it generates a signal at regular intervals for notifying information relating to the provisioned service of the DSC 101, and it performs an instruction to transmit a signal generated via the BLE communication unit 209 or the Wi-Fi communication unit 204.

A DSC function processing unit 208, which is a processing unit relating to a camera function of the DSC 101, performs an image capture, stores the captured image into the storage unit 206, displays the stored image data to the UI unit 203, and the like. Note that an explanation concerning other functions relating to the digital camera is omitted. The BLE communication unit 209 executes communication via an antenna 210 in compliance with BLE.

Configuration of the Communication Apparatus
(Smart Phone)

Figure 3:
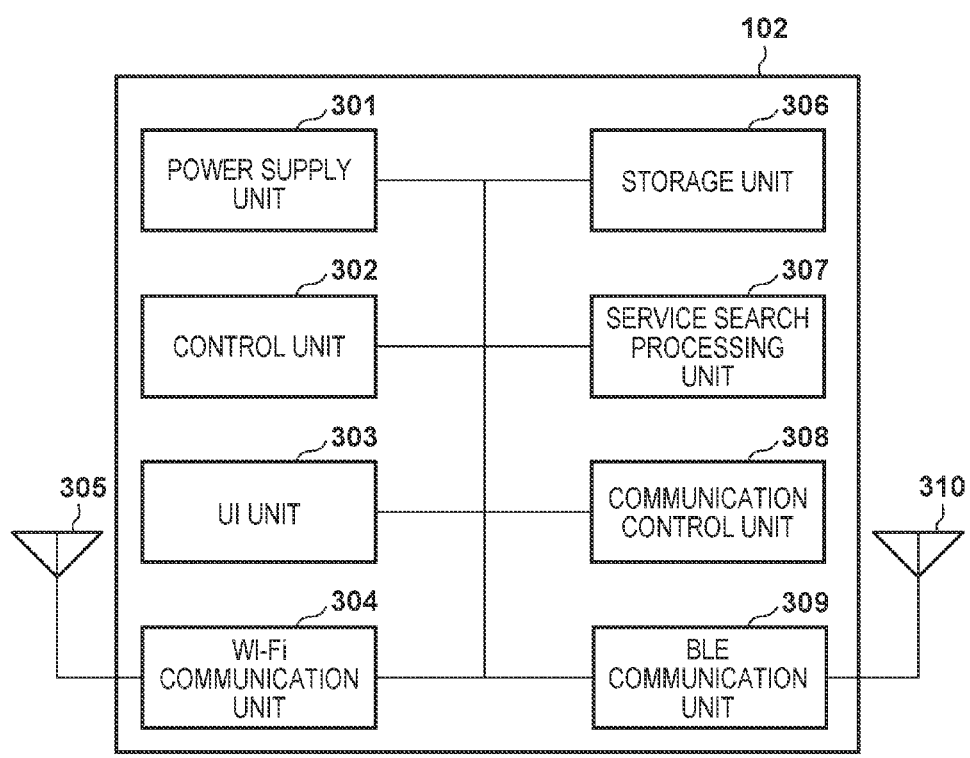
FIG. 3 is a figure illustrating one example of a functional block configuration of a communication apparatus (a smart phone) according to an embodiment of the present invention.

Continuing on, FIG. 3 is a figure illustrating one example of a functional block configuration of the smart phone according to an embodiment of the present invention. A power supply unit 301 supplies power to each element of the smart phone 102. Additionally, although the power supply unit 301 supplies power is obtained from a commercial power supply, it is not limited to this and may be configured to have an integrated battery.

A control unit 302 is configured by a CPU, MPU, or the like, and controls the entire smart phone 102 by performing a program which is stored in a storage unit 306. Note, configuration may be taken such that the control unit 302 controls the entire smart phone 102 by cooperation with an OS (Operating System) that it is executing.

A user interface unit (hereinafter, the UI unit) 303 executes display of various information, or an acceptance of various operations from a user. A Wi-Fi communication unit 304 executes communication via an antenna 305 which is in compliance with the IEEE 802.11 series. The storage unit 306 is configured by a ROM, RAM, or the like, and stores various information of programs (including the OS), image data, or the like for executing various operations described later. Note, the storage unit 306 may use, in addition to a memory such as a ROM or RAM, a storage medium such as an SD memory. A service search processing unit 307 executes a search for a service, and processes a search result obtained from a peripheral device. A BLE communication unit 309 executes communication via an antenna 310 in compliance with BLE. A communication control unit 308 executes processing for switching between the Wi-Fi communication unit 304 and the BLE communication unit 309.

Note that although each functional block illustrated in FIG. 2 and FIG. 3 is implemented by hardware, at least a portion of these functional blocks may also be implemented by a software module. If a functional block is implemented by a software module, the functional block is stored in the storage unit 306, and the function is performed by the control unit 302 which is equipped with a CPU that performs the software.

Communication System Processing Sequence

Figure 4:
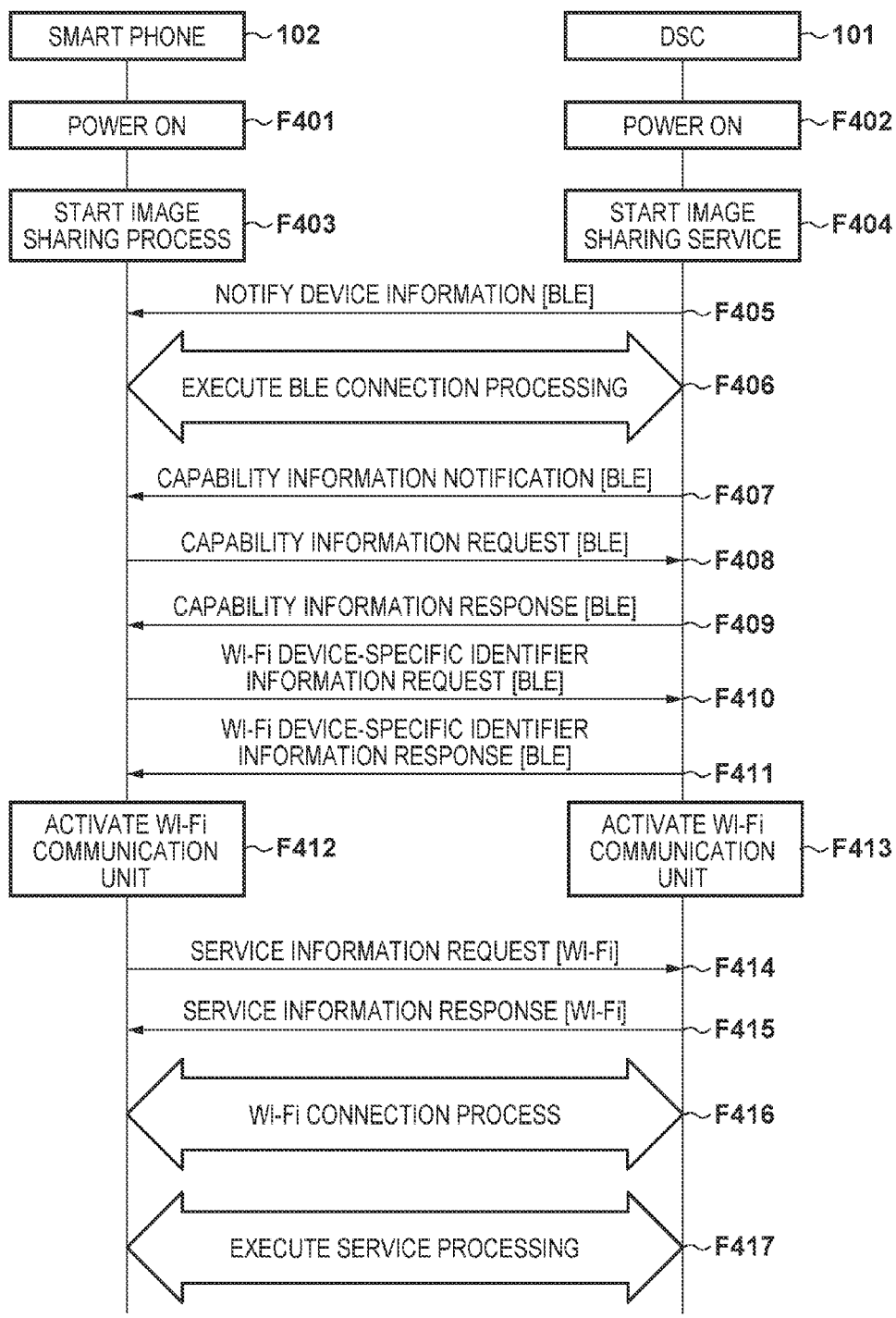
FIG. 4 is a figure for explaining a processing sequence of the communication system according to the first embodiment.
Figure 5:
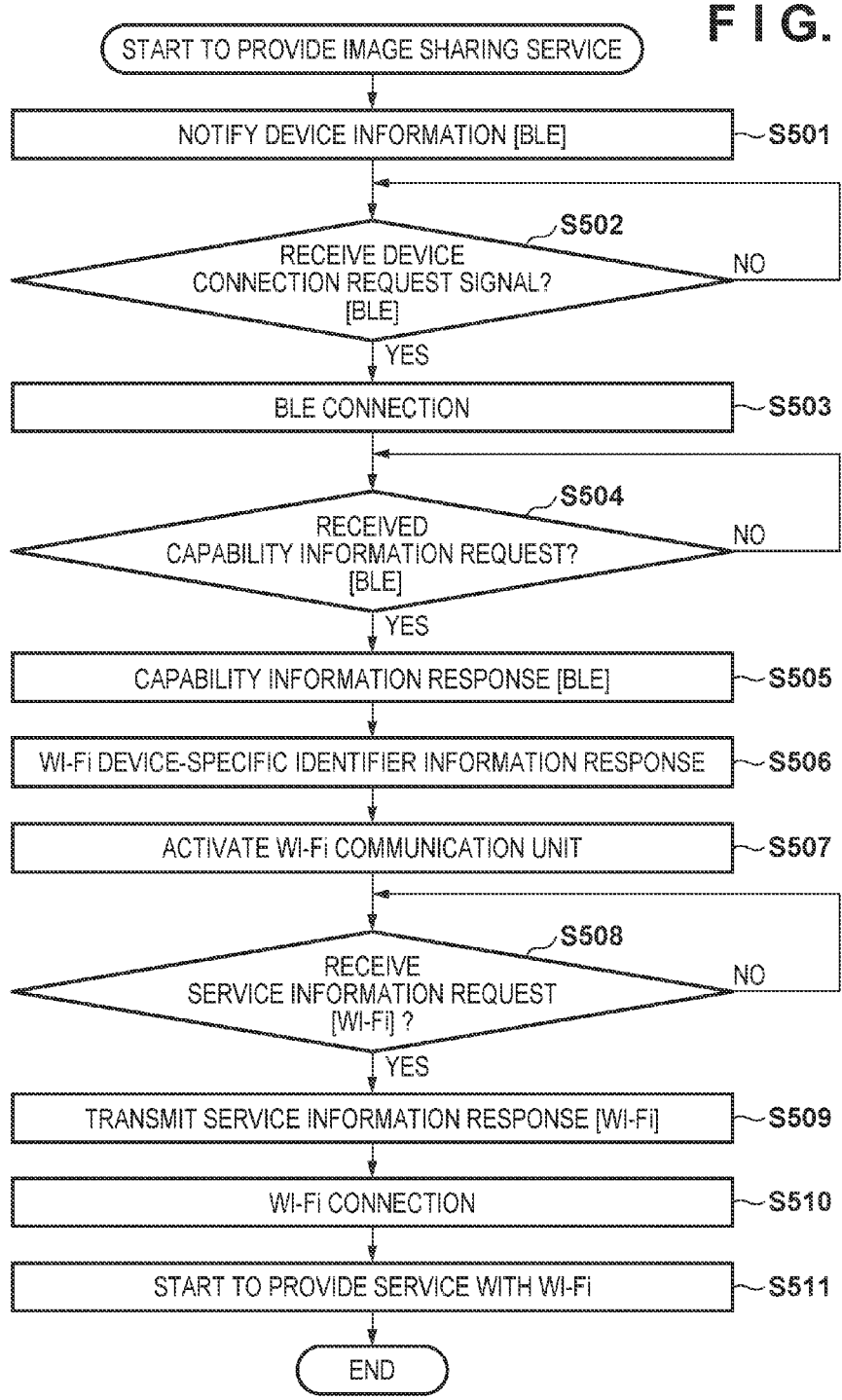
FIG. 5 is a flowchart illustrating a procedure of a process that the communication apparatus (the digital camera) in accordance with an embodiment of the present invention implements.
Figure 6:
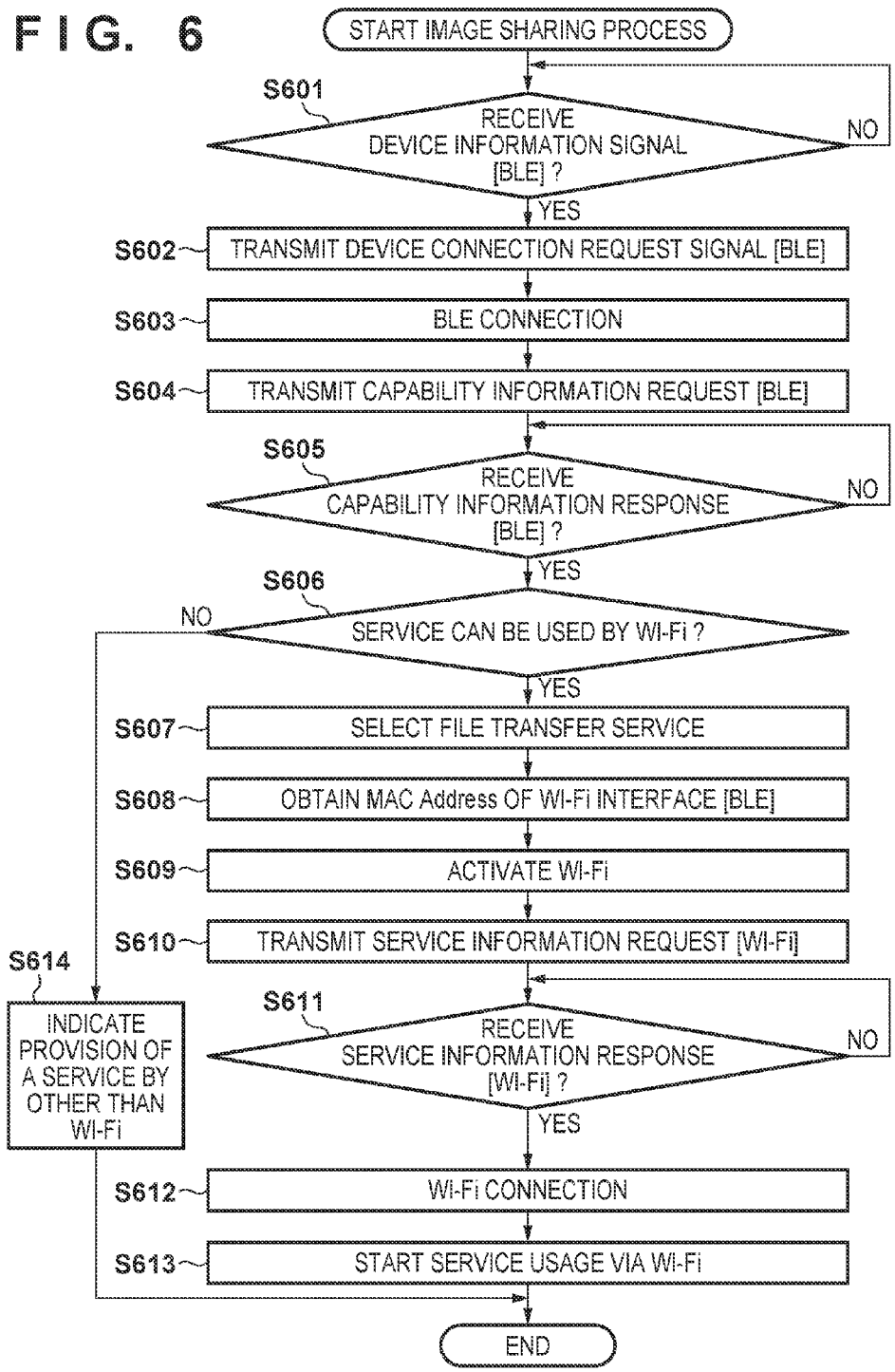
FIG. 6 is a flowchart illustrating a procedure of a process that the communication apparatus (the smart phone) in accordance with an embodiment of the present invention implements.

Next, with reference to the sequence diagram of FIG. 4 and the flowcharts of FIG. 5 and FIG. 6, explanation is given of an operational procedure of a communication system (the DSC 101 and the smart phone 102) in the embodiment of the present invention. The operational procedure illustrates a process for making it possible for the smart phone 102 to obtain captured image data stored in the DSC 101 by Wi-Fi communication or to reference thumbnail information relating to the data.

Firstly, the operational procedure in the DSC 101 is illustrated. Processing of the DSC 101 in the present embodiment starts triggered by a power ON of the DSC 101 (F402). Note, the trigger for the start of the processing in the present invention may also be other than this timing. For example, it may also be performed having been triggered by the start of provision of a service which is a process for transferring captured image data stored in the DSC 101 to another device, or a process for providing thumbnail information relating to the captured image data (F404). A file transfer, printing, or a streaming service can be considered as other concrete examples of a service. Also, until this processing is started, the power supply to the communications function in the BLE communication unit 209 and the Wi-Fi communication unit 204 is in a stopped state.

Upon a trigger of a start of the provision of service, the DSC 101 starts supplying power to the BLE communication unit 209, and starts a notification of a device information signal via the BLE communication unit 209 for providing information relating to the DSC 101 (F405 and step S501). When a device that has completed a BLE pairing process with the DSC 101 (the smart phone 102 here) receives the device information signal, a connection is made by BLE communication (F406, step S502, and step S503).

Note, in FIG. 5, although the flowchart assumes that it is possible to execute the BLE connection with a partner with which pairing is already performed, a case in which a communication partner is employing BLE for a different intended use and the connection request signal cannot be transmitted may occur. Assuming that a BLE pairing partner is absent or that BLE is used for a different intended use and a connection request is not possible, the smart phone 102 may determine an error if the BLE connection request signal cannot be received during a predetermined time period, and apply control to terminate processing. With this, pointless power consumption can be reduced.

On the other hand, when a user turns on the power supply (F401) or a process that necessitates access to a captured image which is stored in the DSC 101 starts in the smart phone 102, processing of the present invention is started (F403). The smart phone 102 in which this processing is started enters a search phase, and in this search phase, the communication control unit 308 starts processing for searching for a peripheral device via the BLE communication unit 309 which can perform BLE communication. In other words, it searches for a device that notifies the device information signal by the BLE communication (F405 and step S601). When it receives the device information signal, the BLE communication unit 309 transmits a device connection request signal (step S602) to the device that is transmitting the device information signal (here the DSC 101). The process of the BLE connection is completed by this processing (F406 and step S603). Note, the connection here means a connection at a Link Layer Level of BLE.

Continuing on, the communication control unit 308 of the smart phone 102 outputs an instruction to obtain information which relates to a service that a peripheral device supports to the service search processing unit 307.

The service search processing unit 307, having received that, transmits a capability information request using BLE communication by the BLE communication unit 309 (F408 and step S604).

The DSC 101, having received the capability information request, transmits the capability information response using the service response processing unit 207 (F409, step S504, and step S505). Service information containing this acknowledgement signal is defined as information which relates to a service implemented by the DSC, illustrated as a concrete example in FIG. 8. As illustrated in FIG. 8, each service that is provided is associated with a communication scheme that is utilized (Wi-Fi or Bluetooth for example). Thus, the smart phone 102, having received the information, can use the service to select whether to realize any communication scheme. As illustrated in FIG. 8, the file transfer service and the print service are compatible with Wi-Fi and BlueTooth. The image transfer service and the streaming service are only compatible with Wi-Fi. OBEX (OBject EXchange) is only compatible with BlueTooth. Note that FIG. 8 is merely one example and limitation is not made to this so long as the relationship between a device that provides a service and a corresponding communication scheme is clearly described.

Also, although the scheme is such that the DSC 101 responds to the capability information request from the smart phone 102 with the capability information response, a scheme in which the DSC 101 actively notifies, and the smart phone 102 receives, information corresponding to the capability information response may be used (F407). In such a case configuration may be taken such that the service search processing unit 307 operates by the DSC 101, triggered by the start of the service, transmitting the information illustrated in FIG. 8 as a capability information notification signal, and the smart phone 102 receiving that. Note, a scheme of the DSC 101 responding with the capability information response to the capability information request and a scheme of the DSC 101 notifying information corresponding to the capability information response to be received by the smart phone 102 may be performed in parallel.

When the smart phone 102 receives the capability information response (or the capability information notification signal) (step S605), the service search processing unit 307 selects a service necessary for a process desired by the user from this service information and obtains information of a communication scheme that can be used in the service. Then, it is determined whether or not the service can use Wi-Fi (step S606). If the service can use Wi-Fi, the processing proceeds to step S607. On the other hand, if the service cannot use Wi-Fi, the service is explicitly indicated (step S614) as being a service that can use communication other than Wi-Fi, such as BLUETOOTH communication for example.

Note, there may also be a case in which Wi-Fi is already in use (during connection to a hotspot, for example) by another service in the DSC 101. In this case, the DSC 101 may include whether or not Wi-Fi can be used for the currently desired service in the capability information response. In such a case, the display unit of the smart phone 102 displays an error notification to the effect that the service was unable to use Wi-Fi because Wi-Fi is currently in use and the DSC 101 terminates the processing. Also, if the unavailability of Wi-Fi of the DSC 101 is detected by the smart phone 102, a usage cancellation request may be made to the DSC 101 by Wi-Fi to prompt a Wi-Fi cancellation operation by the user. With this, power saving of the entire system can be realized because it is possible to determine the availability of a connection for the desired service at an early stage.

In this embodiment, the DSC 101 provides a service that can be utilized by a Wi-Fi communication function. More specifically, the state is such that the DSC 101 provides by Wi-Fi communication a "file transfer" service that realizes an "image sharing process" which is a process that the user desires. Accordingly, the service search processing unit 307 selects the "file transfer" service that realizes the "image sharing process" which is the process that the user desires (step S607). When this service is selected, the service search processing unit 307 executes (F410: a Wi-Fi device-specific identifier information request) a query of a device-specific identifier of a Wi-Fi interface that realizes this service towards the DSC 101, which is a BLE connection device. A MAC (Media Access Control) Address or a UUID (Universally Unique Identifier) or the like can be considered as one example of the device-specific identifier.

The service response processing unit 207 of the DSC 101, which has received the query, includes a self-apparatus device-specific identifier in an acknowledgement signal and sends it as a Wi-Fi device-specific identifier information response (F411 and step S506). Additionally, the service response processing unit 207 makes an activation request to the Wi-Fi communication unit 204 in preparation for a query via Wi-Fi communication from the smart phone 102. The Wi-Fi communication unit 204, having received this, receives a power supply from the power supply unit 201 and executes an activation process (F413 and step S507).

In the smart phone 102, when a device-specific identifier obtainment process is completed (step S608), the communication control unit 308 of the smart phone 102 instructs the Wi-Fi communication unit 304 to activate, and the Wi-Fi communication unit 304 activates having received this (F412 and step S609). Additionally, a service information request is sent in order to execute a query regarding details of the "file transfer service" to the DSC 101 by using by the device-specific identifier obtained earlier via the Wi-Fi communication unit 304 (F414 and step S610). A method in which a Service Discovery Request frame that uses an action frame defined by IEEE 802.11u is transmitted can be considered as the method for querying.

The DSC 101, having received the service information request (step S508), transmits a service information response containing detail information for executing "the file transfer service" (F415 and step S509). Similarly, a method in which a Service Discovery Response frame that uses an action frame defined by IEEE 802.11u is transmitted can be considered for this response.

In the smart phone 102, when the service information response is received (when the service information obtainment process is completed), the service search processing unit 307 of the smart phone 102 starts usage of "the file transfer" service provided by the DSC 101 for "the image sharing operation" operation desired by the user. In detail, first, Wi-Fi connection processing is performed via Wi-Fi communication units that each of the smart phone 102 and the DSC 101 are equipped with (F416, step S510, and step S612). Additionally, captured image data stored in the DSC 101 can be shared by the smart phone 102 by executing the "file transfer service" via the Wi-Fi communication unit (F417, step S511, and step S613).

As explained above, in this embodiment, the smart phone 102 and the DSC 101 both perform confirmation of the existence or absence of a usable BLE communication service. In other words, the Wi-Fi communication unit is not used. Accordingly, the DSC 101 which provides the service can reduce the consumption of power because it is not necessary to cause the Wi-Fi communication unit to be continuously activated. Because of this, the DSC 101 can allow reduction of power consumption without impairing usability in the smart phone.

In other words, in this embodiment, a query relating to a service via a first communication unit is executed using a second communication unit that can be realized with a lower power consumption than the first communication unit. With this, a reduction of power consumption can be realized since it becomes possible to only activate the first communication unit when usage of the service is determined.

Second Embodiment

Figure 7:
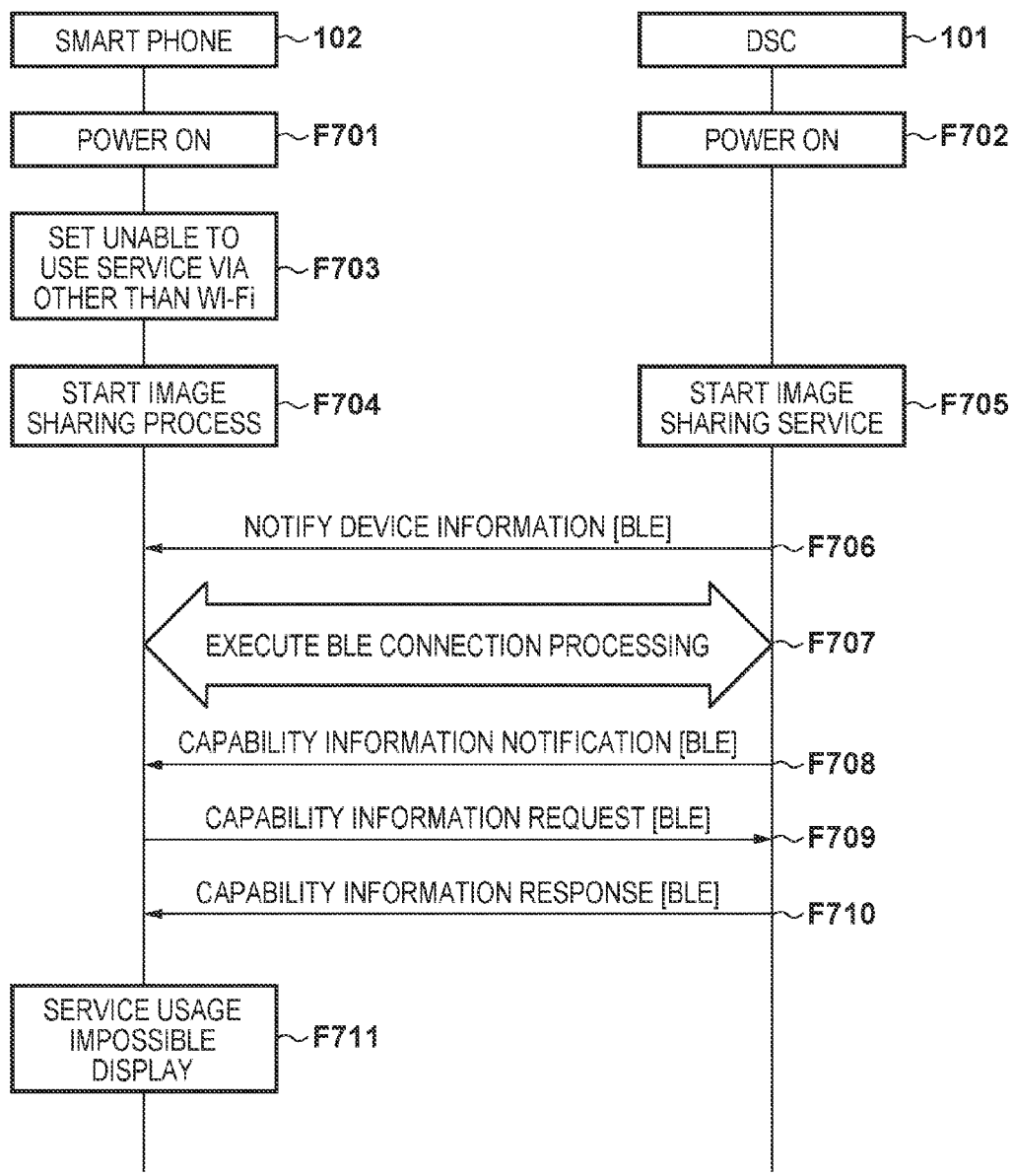
FIG. 7 is a figure for explaining a processing sequence of the communication system according to a second embodiment.

In the first embodiment, explanation is given for a case in which the DSC 101 provides a service that, for processing that a user of the smart phone 102 desires, implements the desired processing. An explanation will be given for another example in this embodiment. Specifically, in the present embodiment, the state is such that the service which the DSC 101 provides cannot be executed by Wi-Fi communication. Note, the configuration of the communication system, and the functional configurations of each device used for the explanation are similar to FIG. 1 through FIG. 3 explained in the first embodiment. Also, the processing procedure is mostly the same as the flowcharts illustrated in FIG. 5 and FIG. 6. The sequence diagram uses FIG. 7 instead of FIG. 4.

Until processing in which, when the smart phone 102 and the DSC 101 are in the state in which they are connected via BLE communication, the smart phone 102 obtains by the BLE communication the provided service information of the DSC 101, the processing is the same as in the first embodiment (excluding F703, the processing of F701 through F710).

The service search processing unit 307 of the smart phone 102, when the service information that the DSC 101 provides is obtained, executes the determination processing of step S606 based on the provisioned service and the compatible communication functions. Here, the DSC 101 does not execute the service provision by Wi-Fi communication. Accordingly, the smart phone 102 notifies an error to a user that the DSC 101, which is a connected apparatus, is not providing a service that can be realized by the Wi-Fi communication. More specifically, it is explicitly indicated on the user interface unit 303 that there is no service for which Wi-Fi communication is possible (F711). Here, processing of step S614 of FIG. 6, in this embodiment, is substituted by the control unit 302 with the processing of explicitly indicating on the user interface unit that there is no service for which Wi-Fi communication is possible.

Additionally, the service search processing unit 307 of the smart phone 102 may have a function which can be set to either allow a service execution only by Wi-Fi communication, or also allow a service execution other than by Wi-Fi communication. In the case of the present embodiment, since it is possible to avoid service execution other than high speed communication of Wi-Fi communication by setting (F703) "allow a service execution only by Wi-Fi communication (prohibit service usage other than by Wi-Fi)", a situation that in which a user is wrapped up in service processing for a long time can be avoided. Also, in a case to set "also allow a service execution other than by Wi-Fi communication", it is possible to respond to a user's intention to want to perform a process even if it will take a long time for example.

As explained above, in this embodiment, the smart phone 102 and the DSC 101 both perform confirmation of the existence or absence of a usable BLE communication service. In a case that a service providing device does not provide a service using Wi-Fi communication, as in the present embodiment, since a service utilizing device can confirm that without activating the Wi-Fi communication unit, it is possible to reduce power consumption more.

In the embodiments described above, although the use of Wi-Fi is explained as an example of a first communication and the use of BLE is explained as an example of the second communication, if the power used by the second communication is less than the power used by the first communication, a communication scheme other than BLE and Wi-Fi may be applied.

In accordance with the present invention, it is possible to reduce the power consumption corresponding to the communication processing in the communication apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-113349, filed Jun. 3, 2015, which is hereby incorporated by reference wherein in its entirety.

What is claimed is:

1. A communication apparatus, comprising:
a first obtaining unit configured to obtain, from another communication apparatus, information indicating a type of a service that can be executed by using a first communication unit, wherein the first obtaining unit is configured to perform the obtaining by using a second communication unit whose power consumption is less than the first communication unit;
a determining unit configured to determine, based on the information obtained by the first obtaining unit, whether the another communication apparatus can perform a service necessary for a process desired by a user;
a second obtaining unit configured to, using the first communication unit, obtain from the another communication apparatus detail information necessary for performing a service indicated by the information obtained by the first obtaining unit, in a case where the determining unit determines that the another communication apparatus can perform the service necessary for a process desired by a user; and
a control unit configured to perform the service using the first communication unit based on the detail information obtained by the second obtaining unit.

2. The communication apparatus according to claim 1, wherein the first obtaining unit obtains information notified by the another communication apparatus.

3. The communication apparatus according to claim 1, wherein the first obtaining unit requests, to the another communication apparatus, information that indicates the type of service to obtain the information by a response from the another communication apparatus.

4. The communication apparatus according to claim 1, further comprising a third obtaining unit configured to, using the second communication unit, obtain an identifier of the another communication apparatus for performing a communication that uses the first communication unit from the another communication apparatus, wherein
the second obtaining unit obtains the detail information from the another communication apparatus based on the identifier obtained by the third obtaining unit.

5. The communication apparatus according to claim 1, wherein the second obtaining unit requests, to the another communication apparatus, the detail information to obtain the detail information by a response from the another communication apparatus.

6. The communication apparatus according to claim 1, further comprising a notification unit configured to communicate to the user that the service necessary for a process desired by the user cannot be performed in a case when the another communication apparatus does not provide the service based on the information obtained by the first obtaining unit.

7. The communication apparatus according to claim 1, wherein the first communication unit is a communication unit that performs communication using Wi-Fi and the second communication unit is a communication unit that performs communication using Bluetooth Low Energy.

8. A method of controlling a communication apparatus, the method comprising:
first obtaining, from another communication apparatus, information indicating a type of a service that can be executed by using a first communication unit, wherein the first obtaining is performed by using a second communication unit whose power consumption is less than the first communication unit;
determining, based on the information obtained in the first obtaining, whether the another communication apparatus can perform a service necessary for a process desired by a user;
second obtaining, using the first communication unit, from the another communication apparatus detail information necessary for performing a service indicated by the first obtained information, in a case where it is determined in the determining that the another communication apparatus can perform the service necessary for a process desired by a user; and
performing the service using the first communication unit based on the second obtained detail information.

9. A non-transitory computer-readable storage medium storing a computer program for causing a computer to:
first obtain, from another communication apparatus, information indicating a type of a service that can be executed by using a first communication unit, wherein the first obtaining is performed by using a second communication unit whose power consumption is less than the first communication unit;
determine, based on the obtained information, whether the another communication apparatus can perform a service necessary for a process desired by a user;
second obtain, using the first communication unit, from the another communication apparatus detail information necessary for performing a service indicated by the first obtained information, in a case where it is determined that the another communication apparatus can perform the service necessary for a process desired by a user; and
performing the service using the first communication unit based on the second obtained detail information.

* * * * *